United States Patent
Sturm (10) Patent No.: US 12,051,252 B2
(45) Date of Patent: *Jul. 30, 2024

(54) LOCATION DISCOVERY

(71) Applicant: Google LLC, Mountain View, CA (US)

(72) Inventor: Juergen Sturm, Munich (DE)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,333

(22) Filed: Apr. 5, 2023

(65) Prior Publication Data

US 2023/0245476 A1    Aug. 3, 2023

Related U.S. Application Data

(63) Continuation of application No. 17/305,665, filed on Jul. 12, 2021, now Pat. No. 11,631,191, which is a continuation of application No. 16/773,787, filed on Jan. 27, 2020, now Pat. No. 11,069,081.

(60) Provisional application No. 62/796,996, filed on Jan. 25, 2019.

(51) Int. Cl.
| | |
|---|---|
| *G06V 20/64* | (2022.01) |
| *G06K 19/06* | (2006.01) |
| *G06T 7/70* | (2017.01) |
| *G06V 20/00* | (2022.01) |
| *G06V 20/40* | (2022.01) |
| *G06V 20/62* | (2022.01) |

(52) U.S. Cl.
CPC ....... *G06V 20/64* (2022.01); *G06K 19/06028* (2013.01); *G06T 7/70* (2017.01); *G06V 20/00* (2022.01); *G06V 20/40* (2022.01); *G06V 20/62* (2022.01); *G06T 2207/10028* (2013.01)

(58) Field of Classification Search
CPC ............ G06T 7/70; G06T 2207/10028; G06K 19/06028; G06K 9/00624
See application file for complete search history.

(56) References Cited

U.S. PATENT DOCUMENTS

| | | |
|---|---|---|
| 9,928,438 B2 | 3/2018 | Wu et al. |
| 10,438,371 B2 | 10/2019 | Xu et al. |
| 10,817,760 B2 | 10/2020 | Pradeep et al. |
| 11,015,938 B2 | 5/2021 | Narendra et al. |
| 11,069,081 B1 | 7/2021 | Sturm |

(Continued)

*Primary Examiner* — Tom Y Lu
(74) *Attorney, Agent, or Firm* — Honigman LLP; Brett A. Krueger (57) ABSTRACT

In an aspect, a computer implemented method receives, for a volume within a building, a set of images captured from corresponding locations within the volume, each image taken at a corresponding location, and each image having data specifying the corresponding location from which the image was captured; receiving a three-dimensional point cloud of the volume; detects, using one or more computer vision processing techniques, items of interest within the images; for each item of interest in each image, determines, based on the point cloud and the data specifying the corresponding locations from which the images were captured, a coordinate for the item of interest, the coordinate specifying a location within the volume that corresponds to the item of interest in the image; and stores the data specifying each item of interest and, for each item of interest, its determined coordinate, in a data storage.

20 Claims, 6 Drawing Sheets

(56) References Cited

U.S. PATENT DOCUMENTS

| | | | |
|---|---|---|---|
| 11,100,300 B2 * | 8/2021 | Plummer | ............... H04N 23/80 |
| 2010/0017407 A1 | 1/2010 | Beniyama et al. | |
| 2017/0337506 A1 | 11/2017 | Wise et al. | |
| 2018/0319594 A1 | 11/2018 | Blevins et al. | |
| 2020/0074676 A1 | 3/2020 | Nomasa et al. | |

* cited by examiner

LOCATION DISCOVERY

CROSS-REFERENCE TO RELATED APPLICATION

This U.S. patent application is a continuation of, and claims priority under 35 U.S.C. § 120 from, U.S. patent application Ser. No. 17/305,665, filed on Jul. 12, 2021, which is a continuation of U.S. patent application Ser. No. 16/773,787, filed on Jan. 27, 2020, now U.S. Pat. No. 11,069,081, which claims priority under 35 U.S.C. § 119(e) to U.S. Provisional Application 62/796,996, filed on Jan. 25, 2019. The disclosures of these prior applications are considered part of the disclosure of this application and are hereby incorporated by reference in their entireties.

BACKGROUND

This specification relates to processing image data.

Mobile robots should be able to carry out tasks related to locations. For example, a mobile robot in a warehouse should be able to carry out navigation, inventory and transportation tasks.

One way to enable mobile robots to accomplish these tasks is by manually indicating points of interests (POIs). For example, when a robot is supposed to pick up a pallet from storage location 02-01-05 (aisle 02, level 01, compartment 05), the mobile robot must translate this information to a waypoint in a coordinate frame. To enable a mobile robot to do this, a human operator manually marks a set of POIs on a robot map and names each POI correspondingly (e.g., with text labels "02-01-05"). The robot can then perform the lookup from a location to a coordinate relative to the robot map.

SUMMARY

This specification generally describes a system implemented as computer programs on one or more computers in one or more locations that performs automated location discovery. In particular, the system can determine respective three-dimensional locations of items of interest in an environment, e.g., a warehouse or a retail store.

The system can receive as input sensor data characterizing the environment. The sensor data can include one or more images of the environment and a point cloud characterizing the environment. The system can process the images of the environment to determine, for each of multiple items of interest, a respective location in one or more images of the item of interest. For each item of interest, the system can use the determined location of the item of interest in an image, as well as data characterizing a location and orientation in the environment of the camera that captured the image at the time the image was captured, determine a three-dimensional location of the item of interest in the environment. In particular, the system can determine a virtual representation of the image in the environment, and project a ray from the center of the camera through the determined location of the item of interest in the virtual representation of the image, until the ray intersects a point in the point cloud. The coordinate of the intersected point is determined to be the 3D coordinate of the item of interest. The system can then store each determined item of interest, along with their corresponding coordinates, in a data store. A retrieval system of the environment, e.g., an autonomous robot that is configured to retrieve desired objects from the environment, can then use the data store to determine respective locations in the environment of desired objects to be retrieved. In some cases, the desired objects to be retrieved are the same as the items of interest. In some other cases, the locations of the desired objects to be retrieved can be inferred by the retrieval system using the locations of the items of interest.

The subject matter described in this specification can be implemented in particular embodiments so as to realize one or more of the following advantages.

In many applications, it is necessary or desirable to generate a "digital twin" of a physical environment, i.e., a digital model of the environment. Using the techniques described in this specification, a system can automatically populate a digital twin of an environment with POIs, where each POI has a 3D coordinate corresponding to a particular location in the environment.

The automated generation of coordinates for text and barcodes and other items of interest in images eliminates the need for manually mapping between logical storage locations and their corresponding physical coordinates in a warehouse or other environment. Because manually mapping is prone to error, the automated generation of coordinates results in a data set that is more accurate than a data set that is manually generated. Furthermore, warehouses of a certain size can reshuffle the locations of products every week, requiring time-consuming and labor-intensive manual mapping just as often.

The use of multiple images to reconcile common items of interest (e.g., a same string of text in multiple images, each image taken from different locations and capture the same string) reduces identification noise and location noise that results from single image errors.

Additional advantages realized by the system are readily apparent. The system provides a fully automatic way to bootstrap the list of POIs. Warehouses (and other spaces such as supermarkets, office buildings, schools, etc.) thus become "text searchable." For example, to locate a room called "01-02-03" for which no person created a corresponding POI on a map, the system will have generated POIs for every text label that is physically present in the space. Therefore, a building can be indexed spatially and become accessible through text search.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
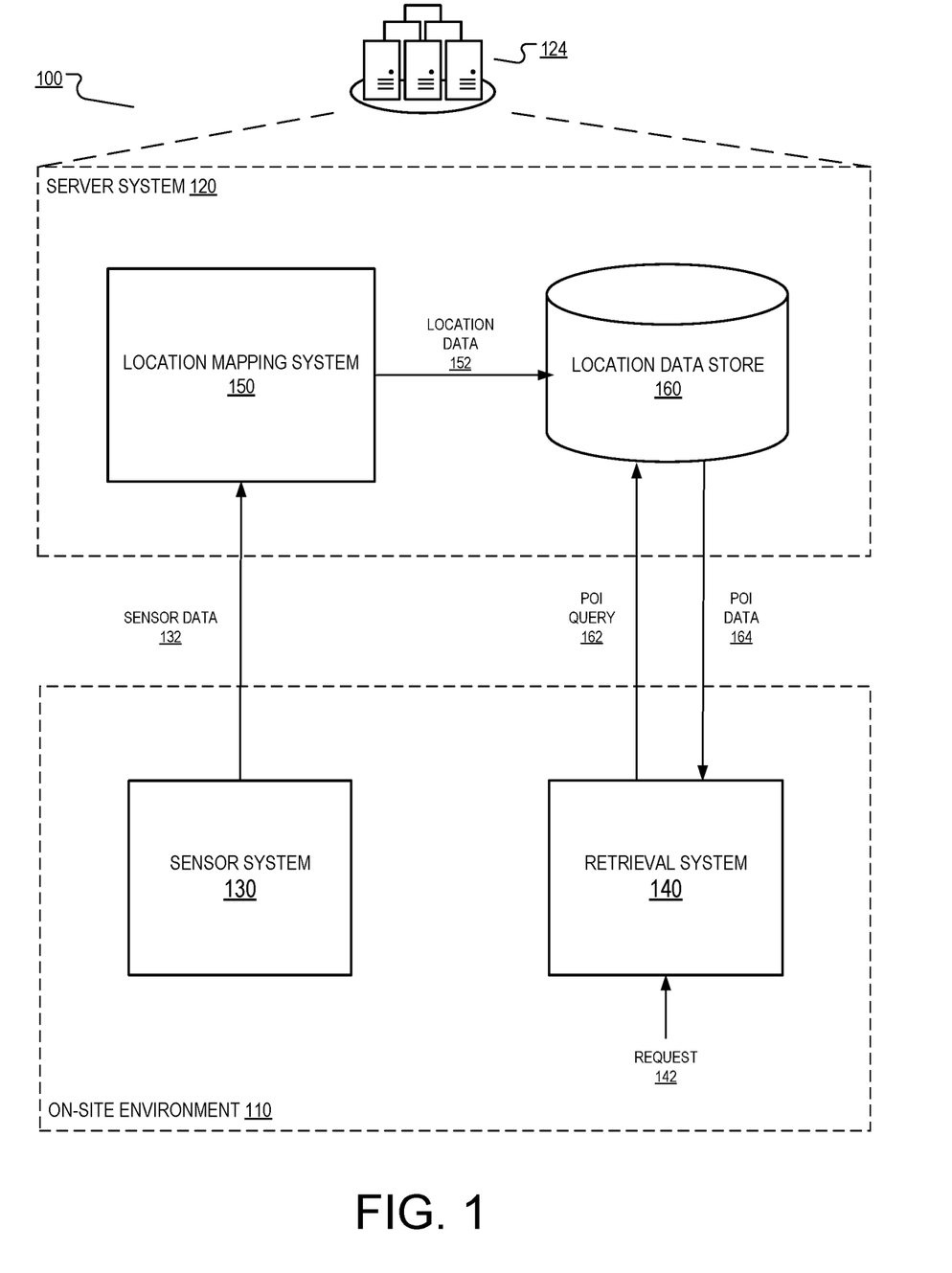
FIG. 1 is a diagram of an example system.

FIG. 1 is a diagram of an example system 100. The system includes an on-site environment 110 and a server system 120.

The on-site environment 110 is a real-world environment that contains one or more points-of-interest (POIs) for which a user wishes to generate three-dimensional coordinates. In some cases, a POI can be a single point in the real-world environment. In some other cases, a POI can be a two-dimensional (e.g., a label for a location or object of interest) or three-dimensional object in the real-world environment.

The on-site environment 110 can be any environment that contains POIs with machine-readable labels. As a particular example, the on-site environment 110 can be a storage room of a warehouse that uses barcodes or text labels to identify shelves and/or particular packages. As another particular example, the on-site environment 110 can be a library that uses barcodes or text labels to identify bookshelves and/or particular books. As another particular example, the on-site environment 110 can be a retail store that uses barcodes or text labels to identify products and/or store shelves.

The on-site environment 110 includes a sensor system 130. The sensor system 130 can include one or more laser scanners and one or more cameras that capture observations of the on-site environment 110. In particular, the sensor system 130 can capture a three-dimensional (3D) point cloud of the on-site environment 110 as well as multiple images of the on-site environment 110 from respective locations and angles within the on-site environment 110. Each of the points in the 3D point cloud is characterized by three coordinates, e.g., (x, y, z) coordinates in a common coordinate system of the on-site environment 110. In some implementations, sensor system 130 includes one or more cameras that have fish-eye lenses, i.e. lenses that capture images at very wide angles.

In some implementations, the laser scanners and cameras of the sensor subsystem 130 move throughout the on-site environment 110 to capture desired observations of the on-site environment 110 from multiple locations and angles within the on-site environment 110. As an example, the laser scanners and cameras of the sensor system 130 can be attached to one or more robots in the on-site environment 110. That is, one or more robots can be programmed to navigate the on-site environment 110 in order to capture the desired observations of the on-site environment 110. As another example, the laser scanners and cameras of the sensor system 130 are installed on one or more trolleys that can be manually navigated through the on-site environment by a user. As a particular example, the laser scanners and cameras on-board a robot or trolley can be programmed to capture a new measurement at regular intervals, e.g., every 1/10 meter, 1 meter, or 10 meters that the robot or trolley travels.

As a particular example, a full scan of a typical warehouse may comprise approximately 100 million, 500 million, or 1 billion points; and 10K, 1 million, or 10 million images.

Each image captured by the sensor system 130 has associated location data that identifies a location in the on-site environment 110 from which the image was captured. For example, the location data for each image can include six coordinates, e.g., (x, y, z) coordinates and (pitch, yaw, roll) coordinates in the common coordinate system of the on-site environment 110, that identify the location and orientation of the camera that captured the image at the time the image was captured. As a particular example, each camera can be in data communication with the robot or trolley on which the camera is mounted, and receive a location of the robot or trolley in the on-site environment at the time a particular image was captured. The camera or another location system can then infer the location and orientation of the camera in the on-site environment 110 from the location of the robot or trolley, and associate the inferred location data with the particular image.

The sensor system 130 can combine the captured observations of the on-site environment, including each captured point cloud and each captured image with associated location data, into a set of sensor data 132. The sensor system 130 can provide the sensor data 132 to a location mapping system 150 in the server system.

In some implementations, the server system 120 can be hosted by one or more computers on-site, e.g., in the same location as the on-site environment 110. In some other implementations, the server system 120 can be hosted within a data center 124, which can be a distributed computing system having hundreds or thousands of computers in one or more locations.

The location mapping system 150 uses the sensor data 132 to identify one or more points of interest in the on-site environment 110, and generate location data for the points of interest that identify respective 3D locations of the points of interest in the on-site environment 110, e.g., (x, y, z) coordinates in the common coordinate system of the on-site environment 110 for each point of interest. This process described in more detail below in reference to FIG. 2.

The resulting location data 152 defines a list of correspondences between points of interest and 3D locations in the on-site environment 110. Each POI in the location data 152 can have a name. In some implementations, each POI name is unique. In some other implementations, multiple POIs can have the same name; e.g., if POI names are product labels and there are multiple instances of the same product in the on-site environment. The location data 152 can be stored in a location data store 160.

The on-site environment 110 also includes a retrieval system 140. The retrieval system 140 can include one or more robots programmed to extract particular objects of interest from the on-site environment 110. For example, if the on-site environment 110 is a storage room of a warehouse, then a robot in the retrieval system 140 can be dispatched to retrieve a particular package from the storage room so that the particular package can be shipped. As another example, if the on-site environment is a library, then a robot in the retrieval system 140 can be dispatched to retrieve a particular book for a patron of the library. As another particular example, if the on-site environment is a retail store, then a robot in the retrieval system 140 can be dispatched to retrieve a particular product for a customer of the retail store.

The retrieval system 140 can receive a request 142 for an object that is stored in the on-site environment 110. The request 142 can come from a user of the retrieval system 140, or from some other system in the on-site environment.

The request 142 identifies a particular object that is to be retrieved from the on-site environment 110. The retrieval system 140 uses the request 142 to identify a name of a particular POI in the on-site environment 110 that corresponds to the requested object. As a particular example, the POIs of the on-site environment can include storage locations (e.g., "shelf 01-03-08"). In this example, the retrieval system 140 can maintain an inventory of every product in the on-site environment with corresponding storage locations for each product. The retrieval system 140 can determine the POI name corresponding to the requested object by looking up the storage location of the requested object in the inventory. As another particular example, the POIs of the on-site environment can include locations of the objects themselves, e.g., if each object has a machine-readable label on it. In this example, the retrieval system 140 can determine the POI name corresponding to the requested object to be the name of the requested object itself.

To determine a location of the POI in the on-site environment, the retrieval system 140 can submit a POI query 162 to the location data store 160. The POI query identifies a particular POI stored in the location data store 160. The location data store can respond to the POI query 162 with POI data 164. The POI data 164 includes the location of the queried POI in the on-site environment 110, e.g., the 3D coordinates of the POI in the common coordinate system of the on-site environment 110.

In some cases, the location of the requested object is the same as the location of the POI. In these cases, the retrieval system can use the POI data 164 directly to retrieve the requested object, e.g., by planning a path of a robot to the location of the requested object and dispatching a robot to retrieve the object.

In some other implementations, the location of the requested object is different from the location of the POI. In these cases, the retrieval system 140 can use the POI data 164 to determine the location of the requested object. This process is discussed in more detail below in reference to FIG. 3.

Figure 2:
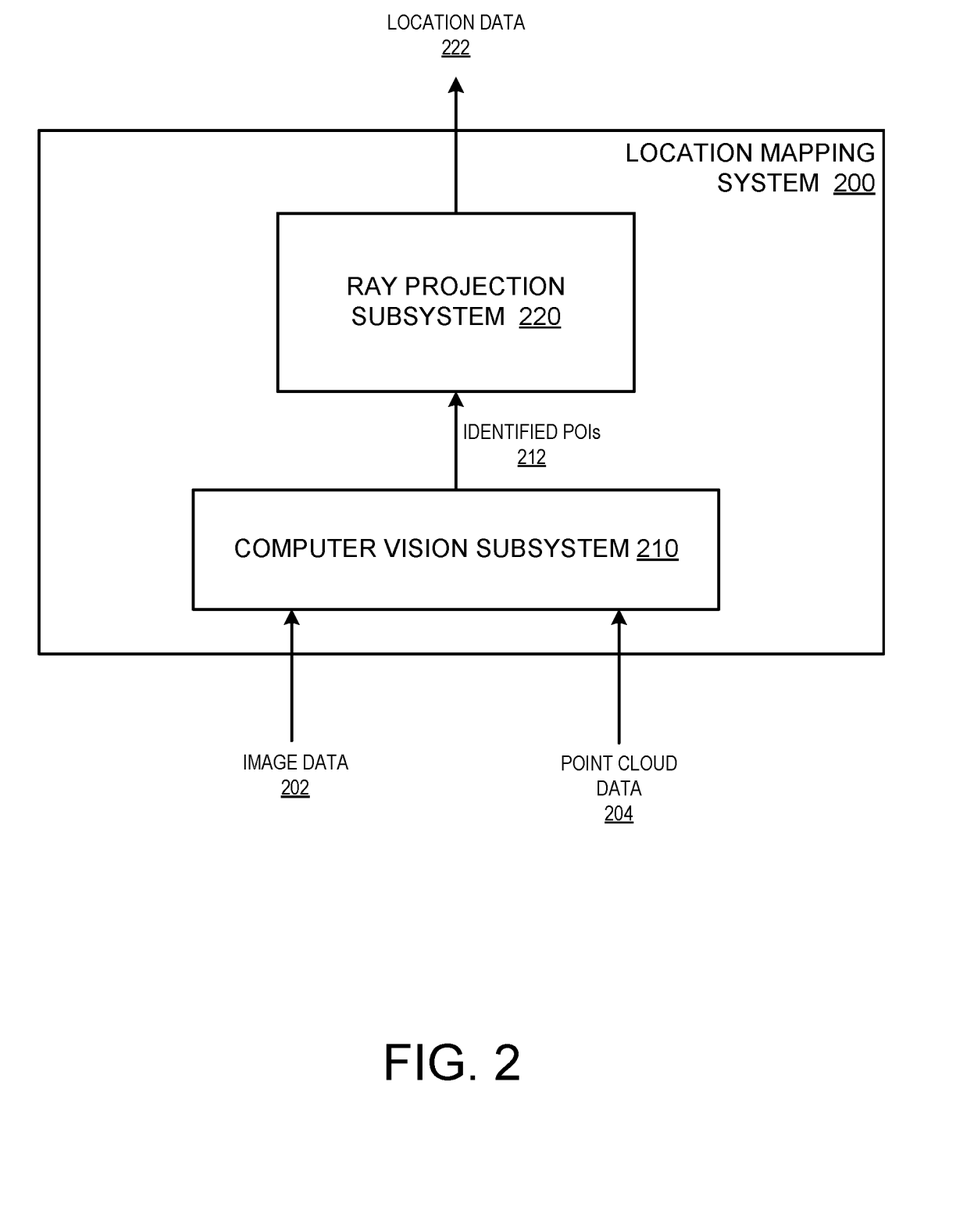
FIG. 2 is a diagram of an example location mapping system.

FIG. 2 is a diagram of an example location mapping system 200. The location mapping system 200 is configured to receive observations of an environment captured by one or more sensors and determine respective 3D locations of one or more POIs in the environment. The location mapping system 200 includes a computer vision subsystem 210 and a ray projection subsystem 220.

The computer vision subsystem receives the observations of the environment as input, namely image data 202 that includes one or more images of the environment and point cloud data 204 that includes a 3D point cloud of the environment. The image data 202 also includes location data corresponding to each image that characterizes a location and orientation in the environment of the camera that captured the image when the image was captured.

The computer vision subsystem 210 processes the images in the image data 202 to identify one or more POIs depicted in the images. The computer vision subsystem 210 can also determine a name for each identified POI.

For example, the computer vision subsystem 210 can process each image using a text recognition machine learning model that is configured to process an image and determine a location of one or more sequences of text that are depicted in the image, as well as a text label for each identified piece of text. The computer vision subsystem 210 can determine each identified piece of text to be a POI. That is, the text recognition machine learning model outputs, for each text POI in the input image, a location in the image of the text POI and a text label characterizing what the text POI says. In some implementations, the location in the image of the text POI is an oriented bounding box in the input image, e.g., a bounding box that is specified by i) its upper left corner in the image, ii) its rotation angle, and iii) its width and height, where these coordinates are specified in pixels. In some implementations, the name of each text POI is determined to be the raw text of the text POI, as recognized by the text recognition machine learning model.

As another example, the computer vision subsystem 210 can process each image using a barcode recognition machine learning model that is configured to process an image and determine a location of one or more barcodes that are depicted in the image, as well as the data encoded in each identified barcode. The computer vision subsystem 210 can determine each identified barcode to be a POI. In some implementations, the location in the image of the barcode POI is an oriented bounding box in the input image. The computer vision subsystem can determine a name for each barcode POI using the data encoded in the respective barcode; that is, if the data encoded in the barcode related to "Shelf 3," then the name of the barcode POI can be "Shelf 3."

The computer vision subsystem 210 can the identified POIs 212 to the ray projection subsystem 220. Each identified POI has a name and a corresponding location in one or more images in the image data 202. That is, the same POI can be depicted in more than one image, if the depictions of the respective images overlap.

The ray projection subsystem 220 uses the images in the image data 202 and the identified POIs 212 to determine a particular point in the point cloud data 204 that characterizes the location of each identified POI. In particular, for each particular image, the ray projection system uses the image data 202 describing the location and orientation of the camera that captured the particular image to project 3D rays through the identified POIs in the particular image, using any appropriate image processing technique. Each ray originates in the camera center, intersects with the image plane of the particular image at the identified location of a particular POI and virtually extends into the scene. Using the point cloud representing the geometry of the scene, the ray projection subsystem 220 can determine the first intersection of the ray with a point in the point cloud to recover the 3D position of the particular POI, e.g., the text label. This process is described in more detail below in reference to FIG. 4.

By projecting rays through POIs identified in every image in the image data 202, the ray projections subsystem 220 generates a large number of 3D locations of POIs. For example, in a dataset with 10K images and 100 detections per image, this would result in the 3D locations of 1 million POIs. As another example, in a dataset with 1 million images and 1,000 detections per image, this would result in the 3D locations of 1 billion POIs. Depending on the density of camera images, the same POI in the environment might be observed tens or even hundreds of times.

Because there are multiple detections of the same POI, the ray projection subsystem 220 can fuse or combine multiple observations in a single POI hypothesis. For this, the system finds all observations that refer to the item (e.g., all POIs with the same name). There are different ways to determine if two label observations correspond to the same object. One way is to have the system determine observations to correspond to the same label if their name and location matches sufficiently (e.g., exact text correspondence of the POI name and a 3D POI location within a threshold distance, e.g., as 30 cm distance). Alternatively, the system can project the pixels from one camera image to another camera image and compute image-based metrics, e.g., visual similarity. Provided a similarity threshold is met, the label is determined to be the same.

In some implementations, a post-filtering step suppresses noisy detections by removing items that have been observed only once (or a few times, below some threshold minimum).

Having identified a 3D location for every POI identified in an image, the ray projection subsystem 220 can output location data 222 that includes the 3D locations and names of every POI in the environment.

In some implementations, the location mapping system 200 can determine the 3D locations of each POI identified by the computer vision subsystem 210 using the image data 202 instead of the point cloud data 204. That is, instead of generating the location data 222 using the ray projection subsystem 220, the computer vision subsystem 210 can output the location data 222 directly. In these implementations, the computer vision subsystem 210 can triangulate the respective 3D locations of POIs using multiple camera images that were captured from different angles within the environment. The computer vision subsystem 210 can use a machine learning model that receives as input multiple images of an environment captured from different angles, where each image includes a depiction of a particular POI, and outputs a 3D location of the particular POI in the environment. In these implementations, the location mapping system 200 would only need to receive the image data 202, and not the point cloud data 204.

Figure 3:
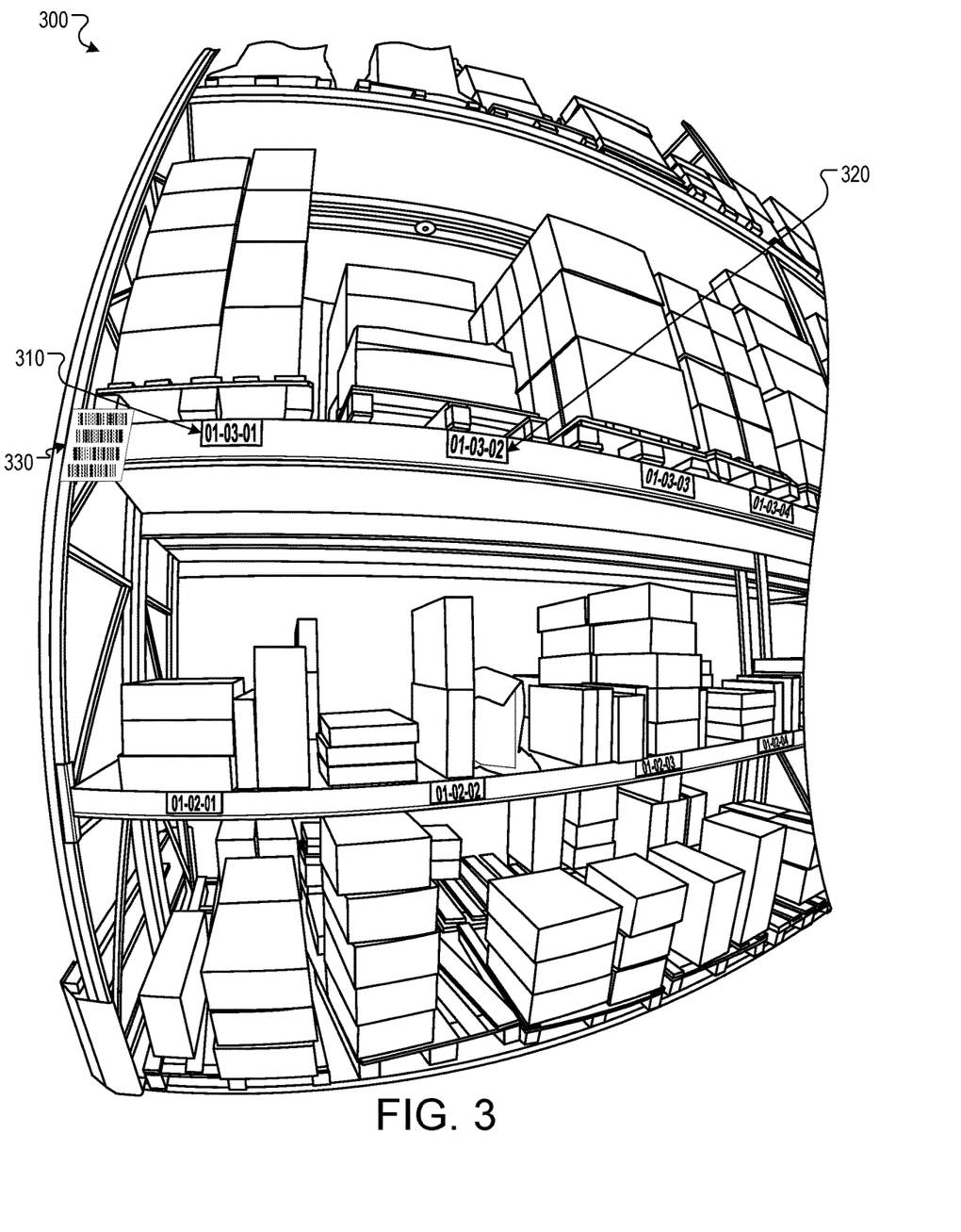
FIG. 3 is an illustration of an example warehouse shelf.

FIG. 3 is an illustration of an example warehouse shelf 300. The warehouse shelf 300 is illustrated from the point of view of a fish-eye camera that captures an image of the warehouse shelf 300.

The warehouse shelf 300 includes multiple labels that might be points of interest in the warehouse. That is, a retrieval system, e.g., the retrieval system 140 depicted in FIG. 1, might need to know a 3D location of each label in a common coordinate system of the warehouse in order to retrieve packages from the shelves.

In particular, it might be important for a retrieval system to know all three coordinates of each label in the common 3D coordinate system of the warehouse. That is, the retrieval system might need to know the height of each label in the warehouse in addition to the (x,y) position of each label in a two-dimensional map of the warehouse floor. This is because the shelves of the warehouse can have multiple stories, so that there are multiple labels in the same (x,y) position in the two-dimensional map of the warehouse floor, while each label has a different height in the common 3D coordinate system of the warehouse corresponding to a different layer of a shelf at the (x,y) position.

For example, a first label 310 says "01-03-01." The first label 310 identifies the particular portion of the warehouse shelf 300 that is directly above the label, e.g., "aisle 1, level 3, column 1." Similarly, a second label 320 says "01-03-02," denoted "aisle 1, level 3, column 2." Both the first label 310 and the second label 320 are in the same location as the object that they refer to, namely the particular portions of the warehouse shelf 300. Therefore, if a location mapping system, e.g., the location mapping system 200 depicted in FIG. 2, determine the 3D locations of the first label 310 and the second label 320 in a common coordinate system of the warehouse, then a retrieval system could use the 3D locations of the labels directly to retrieve objects placed on the warehouse shelf 300.

As another example, a third label 330 includes four barcodes. Each barcode encodes data identifying products located on a respective level of the warehouse shelf 300. In particular, the bottom barcode in the third label 330 refers to the bottom level of the warehouse shelf, the second barcode refers to the second level, and so on. Thus, the third label 330 is not in the same location as the objects that it refers to. Therefore, if a location mapping system identified the third label 330 as a POI and determined a 3D location of the third label POI, a retrieval system would not be able to directly use the 3D location of the third label POI to retrieve an object from the warehouse shelf 300.

Rather, the retrieval system would have to infer the 3D location of a product referenced by the third label 330 based on the 3D location of the third label POI. To accomplish this, the retrieval system can learn the correspondence between a 3D POI location and the actual 3D storage location. As a particular example, the retrieval system can learn that a product placed on the first level of the warehouse shelf 300 is always exactly 2 meters below the 3D POI that refers to the product. In some implementations, the relationship between a 3D POI location and the 3D location of the object to which the POI refers can be manually mapped. In other implementations, this relationship can be learned using supervised learning.

Figure 4:
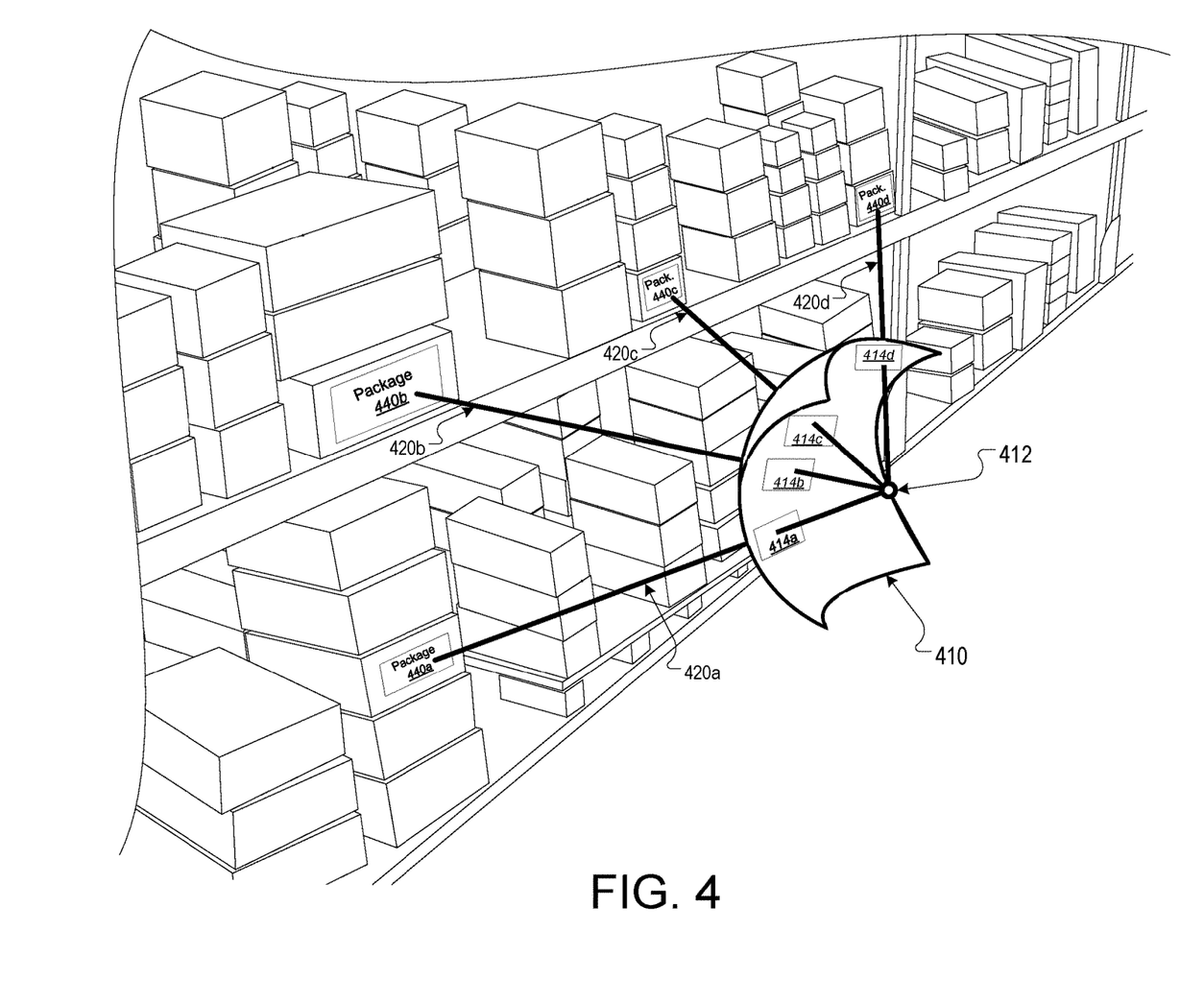
FIG. 4 is an illustration of example rays being projected through a virtual image.

FIG. 4 is an illustration of example rays 420a-d being projected through a virtual image 410.

The virtual image 410 is a representation of an image that was captured of multiple packages sitting on a warehouse shelf of a warehouse. Here, each package is represented by a virtual package 440a-d, and the warehouse shelf is represented by a virtual warehouse shelf 450. The virtual warehouse shelf 450 and the virtual packages 440a-d are composed of respective points in a point cloud that was captured by a laser scanner in the warehouse. Each point in the point cloud is characterized by three coordinates, e.g., (x, y, z) coordinates in a common coordinate space of the warehouse. In some implementations, each point in the point cloud also has a magnitude, where the magnitude characterizes the intensity of the return pulse captured by the laser scanner.

A camera center 312 characterizes the center of the camera that captured the image represented by the virtual image 410 at the time the image was captured, in the common coordinate system of the warehouse. The image represented by the virtual image 410 is a fisheye image; while fisheye images have strong distortions, the correspondence between points in a 3D environment and their projections onto the fisheye image 2D is known. That is, a projected from the camera center through a pixel in the virtual image 410 will hit the point in the warehouse that the pixel in the virtual image 310 characterizes.

The virtual image 410 includes bounding boxes 414a-d. The bounding boxes 414a-d identify POIs depicted in the image represented by the virtual image 410. In particular, the bounding boxes 414a-d identify the pixels in the image that depict package labels of respective packages. The bounding boxes 414a-d might have been generated by a computer vision subsystem, e.g., the computer vision subsystem 210 depicted in FIG. 2, configured to recognize text in the image. In particular, the first bounding box 414a identifies the pixels in the image that depict the package represented by the first virtual package 440a; the second bounding box 414b identifies the pixels in the image that depict the package represented by the second virtual package 440b; and so on.

A ray projection subsystem, e.g., the ray projection subsystem 220 depicted in FIG. 2, can project rays through each bounding box 414a-d in order to identify the 3D locations in the common coordinate system of the warehouse of the POIs depicted in the image represented by the virtual image 410. In particular, a ray projection system can project the first ray 420a through the center of the first bounding 414a until it hits one of the points in the first virtual package 440a. The ray projection system then determines this point to be the location of the POI identified by the first bounding box 414a. That is, the three coordinates that define the point are determined to be the 3D location of the POI that represents the label on the first package. The name of this POI can, e.g., be the text printed on the package. The ray projection system can repeat this process for each ray 420b-c.

In some implementations, each point in the point cloud characterizing the warehouse is assumed to have a particular surface area, so that there is a higher likelihood that a ray that is projected from the virtual image 410 hits a point. If each point did not have a surface area, i.e., they were assumed to be infinitesimally-small points in space, then it might be unlikely that a projected ray would hit one of the points. As a particular example, each point can be assumed to be a sphere that has a radius of 1 cm or 5 cm.

In some implementations, the ray projection subsystem estimates the normal vector at each point in the point cloud that is determined to be the location of a POI, in order to determine in which direction the object characterized by the POI is facing in three dimensions. As a particular example, the system can use the estimated normal vector to determine in which direction the label of a particular package is facing in the common coordinate system of the warehouse. Here, the position of the point and the normal define a plane, onto which the system can project the 2D bounding box depicting the label in the image. This provides the pose and extent of the text label in 3D space. Thus, the coordinates and dimensions of the text label can be determined.

Note that the rays 420*a-d* and the virtual image 410 do not have to be rendered like they are in FIG. 4 in order for a ray projection system to determine the 3D locations of POIs. FIG. 4 depicts an illustration of the computations being performed by the ray projections system. However, a ray projection system may render an illustration similar to the illustration depicted by FIG. 4 to display to a user of the ray projection system, in order to visualize the results of the computations to the user.

Figure 5:
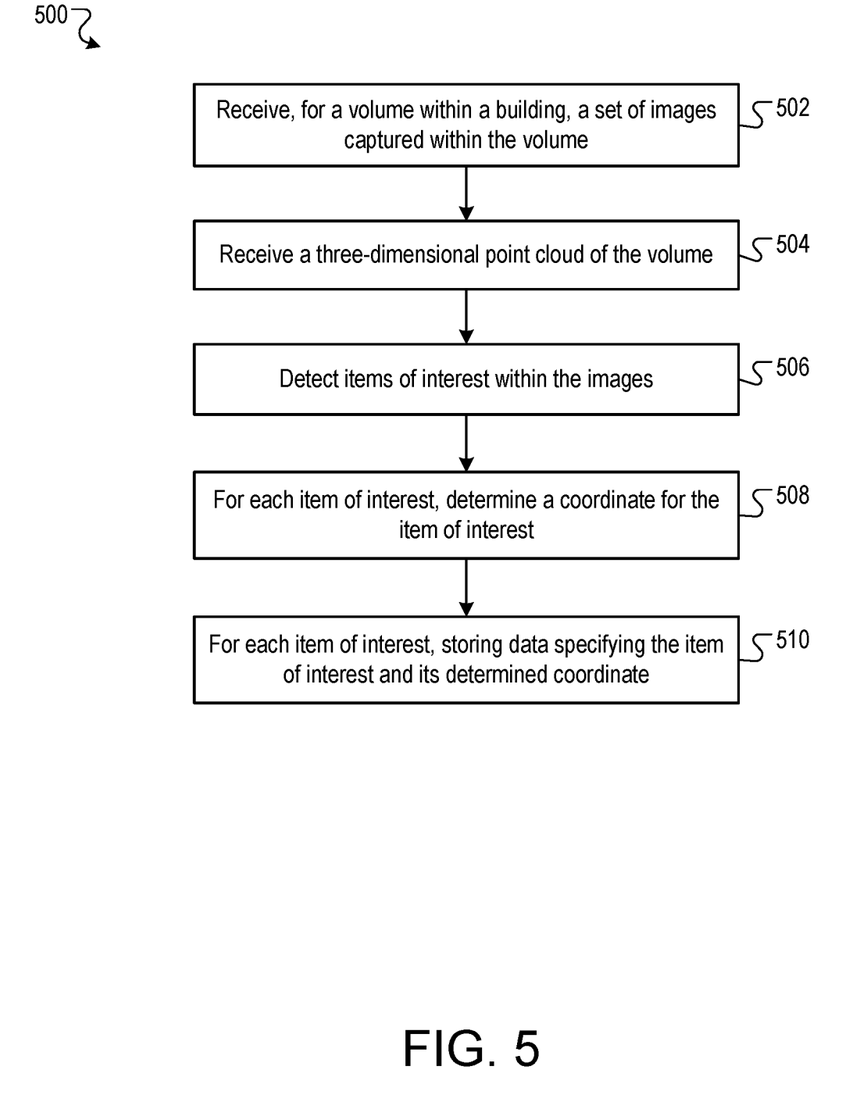
FIG. 5 is a flow diagram of an example process for determining respective 3D coordinates for one or more items of interest.

FIG. 5 is a flow diagram of an example process 500 for determining respective 3D coordinates for one or more items of interest. For convenience, the process 500 will be described as being performed by a system of one or more computers located in one or more locations. For example, a location mapping system, e.g., the location mapping system 200 depicted in FIG. 2, appropriately programmed in accordance with this specification, can perform the process 500.

The system receives, for a volume within a building, a set of images captured from corresponding locations within the volume (step 502). Each image can be taken at a corresponding location, and each image can have data specifying the corresponding location from which the image was captured. In some implementations, the building is a warehouse, and the volume is a room within the warehouse.

The system receives a three-dimensional point cloud of the volume (step 504). Each point cloud can be defined by a coordinate in a common 3D coordinate system of the volume.

The system detects, using one or more computer vision processing techniques, items of interest within the images (step 506).

The system determines, for each item of interest, a coordinate for the item of interest (step 508). The system can make this determination based on the point cloud and the data specifying the corresponding locations from which the images were captured. The coordinate for each item of interest specifies a location within the volume that corresponds to the item of interest in the image.

In some implementations the system determines, using the data specifying the corresponding locations from which the image was captured, a camera center of a camera that captured the image. The camera center can have a coordinate in the common 3D coordinate system of the volume. The system can then, for each item of interest in the image, project a ray from the camera center through a virtual representation of the item of interest in the image until the ray intersects a first point in the point cloud. For example, the system can determine a coordinate, in the common 3D coordinate system of the volume, of the depiction of the item of interest, e.g., a particular pixel on a virtual image characterizing the image in the volume. The system can then project a ray from the camera center through the determined coordinate of the depiction of the item until it hits the first point in the point cloud. The system can determine the coordinate for the item of interest to be the coordinate of the first point.

In some implementations, the system uses the 3D coordinates of one or more other points that are nearby the first point to determine the 3D coordinate for the item of interest. As a particular example, the system can determine the 3D coordinate of the item of interest to be the average coordinate of the respective 3D coordinates of the first point and the other points, e.g., 3, 5, or 10 other points. Doing this can help reduce noise in the determination of the coordinate for the item of interest.

In some implementations, the system discards, for each item of interest, the item of interest if the coordinate for the item of interest was determined using fewer images than a particular threshold number of images. For example, the system can discard the item of interest if, in step 508, the system did not determine at least N coordinates for the item of interest projected from respective virtual images, where each of the N coordinates are within a particular threshold distance of each other, where N is a particular threshold number of images.

The system stores, for each item of interest, data specifying the item of interest and its determined coordinate in a data storage (step 510). In the implementations in which the system discarded one or more of the items of interest, the system stores data specifying each remaining item of interest and its determined coordinate in the data storage.

Figure 6:
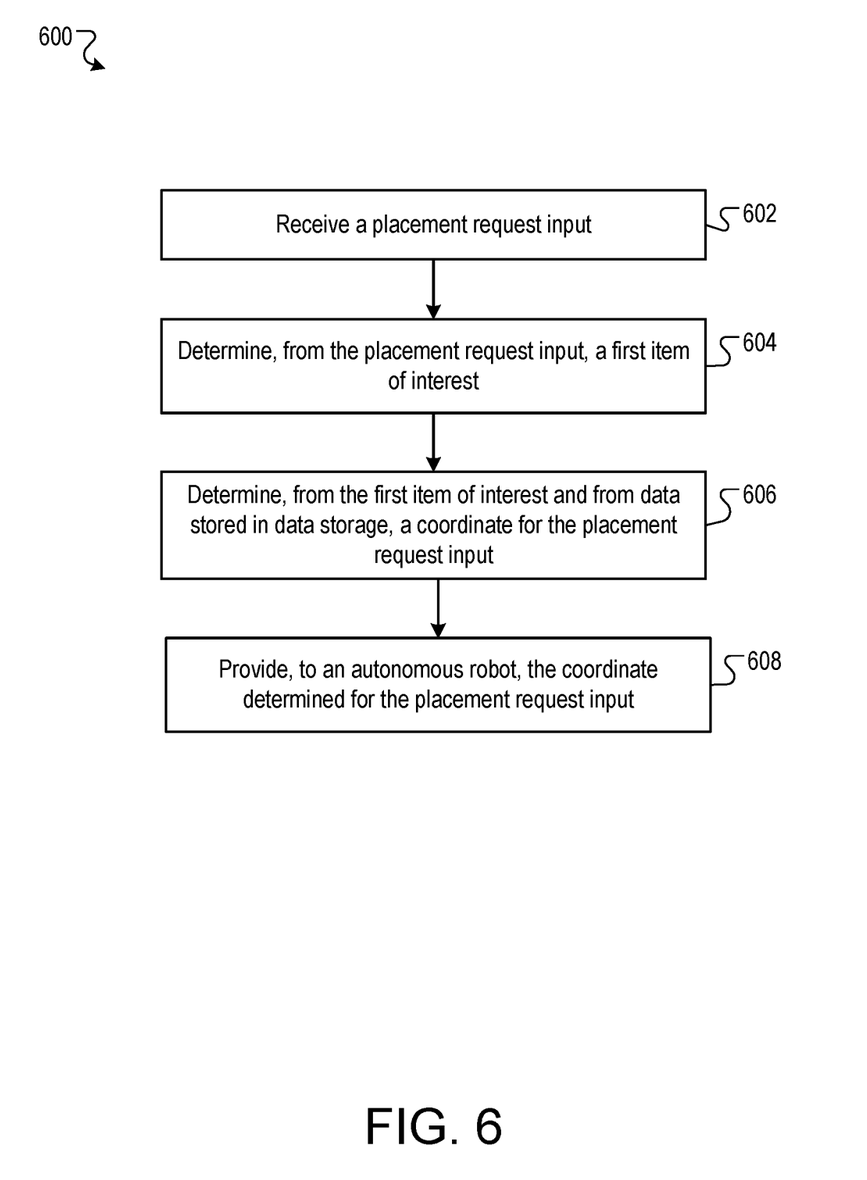
FIG. 6 is a flow diagram of an example process for retrieving an object based on a placement request input.

FIG. 6 is a flow diagram of an example process 600 for retrieving an object based on a placement request input. For convenience, the process 600 will be described as being performed by a system of one or more computers located in one or more locations. For example, a retrieval system, e.g., the retrieval system 140 depicted in FIG. 1, appropriately programmed in accordance with this specification, can perform the process 600.

The system receives a placement request input (step 602). The placement request input can characterize a particular object that a user wishes to retrieve from a volume within a building. In some implementations, the building is a warehouse, and the volume is a room within the warehouse.

The system determines, from the placement request input, a first item of interest (step 604). For example, the first item of interest can have a name that is the same as a name of the placement request input, e.g., the name of a product stored in a warehouse. As another example, the system can determine the first item of interest to be a particular location, e.g., a label for a shelf on which the particular object is stored, by looking the particular object up in an inventory for the volume, where the inventory stores a mapping of objects to respective items of interest.

In some cases, the first item of interest is text data or bar code data.

The system determines, from the first item of interest and from data stored in data storage, a coordinate for the placement request input (step 606). The data stored in data storage can include 3D locations within the volume of each of multiple items of interest, including the first item of interest. That is, the system can query the data storage to determine 3D coordinates in a common coordinate system of the volume of the first item of interest.

In some cases, the coordinates for the placement request input is equal to the coordinates of the first item of interest that is stored in the data storage. In some other implementations, the system can determine the coordinate for the placement request input from a known relationship between the first item of interest and the placement request input.

The system provides, to an autonomous robot, the coordinate determined for the placement request input (step 608). The autonomous robot can use the coordinate to retrieve the object characterized by the placement request input.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data 6 generated at the user device, e.g., a result of the user interaction, can be received at the server from the device.

In addition to the embodiments described above, the following embodiments are also innovative:

Embodiment 1 is a computer implemented method comprising:
  receiving, for a volume within a building, a set of images captured from corresponding locations within the volume, each image taken at a corresponding location, and each image having data specifying the corresponding location from which the image was captured;
  receiving a three-dimensional point cloud of the volume;
  detecting, using one or more computer vision processing techniques, items of interest within the images;
  for each item of interest in each image, determining, based on the point cloud and the data specifying the corresponding locations from which the images were captured, a coordinate for the item of interest, the coordinate specifying a location within the volume that corresponds to the item of interest in the image; and
  storing the data specifying each item of interest and, for each item of interest, its determined coordinate, in a data storage.

Embodiment 2 is the method of embodiment 1, further comprising:
  receiving a placement request input;
  determining, from the placement request input, a first item of interest; and
  determining, from the first item of interest and from the data stored in the data storage, a coordinate for the placement request input.

Embodiment 3 is the method of embodiment 2, wherein the first item of interest is one or more of text data or bar code data.

Embodiment 4 is the method of any one of embodiments 2 or 3, further comprising:
  providing, to an autonomous robot, the coordinate determined for the placement request input.

Embodiment 5 is the method of any one of embodiments 1-4, wherein the building is a warehouse, and the volume is a room within the warehouse.

Embodiment 6 is the method of any one of embodiments 1-5, wherein determining a coordinate for each item of interest comprises, for each image:
  determining, using the data specifying the corresponding locations from which the image was captured, a camera center of a camera that captured the image;
  for each item of interest in the image, projecting a ray from the camera center through a virtual representation of the item of interest in the image until the ray intersects a first point in the point cloud; and
  for each item of interest, determining the coordinate for the item of interest to be a coordinate of the first point.

Embodiment 7 is the method of any one of embodiments 1-6, further comprising, for each item of interest, discarding the item of interest if the coordinate for the item of interest was determined using fewer images than a particular threshold number of images.

Embodiment 8 is a system comprising one or more computers and one or more storage devices storing instructions that are operable, when executed by the one or more computers, to cause the one or more computers to perform the method of any one of embodiments 1 to 7.

Embodiment 9 is a computer storage medium encoded with a computer program, the program comprising instructions that are operable, when executed by data processing apparatus, to cause the data processing apparatus to perform the method of any one of embodiments 1 to 7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method when executed by data processing hardware causes the data processing hardware to perform operations comprising:
   receiving, for a volume within an environment, a set of images, each respective image captured by a camera at a corresponding location within the environment;
   detecting, using computer vision processing, a plurality of items of interest within the set of images; and
   for each respective item of interest in each respective image:
      projecting a ray from a camera center of the camera through a virtual representation of the respective item of interest in the respective image; and
      determining a coordinate for the respective item of interest corresponding to a coordinate of the volume within the environment.

2. The computer-implemented method of claim 1, wherein determining the coordinate for the respective item of interest further comprises:
   identifying that an identifier corresponding to the respective item of interest fails to be collocated with the respective item of interest; and
   determining a relationship between a location of the identifier corresponding to the respective item of interest and a location of the respective item of interest.

3. The computer-implemented method of claim 1, wherein detecting, using the computer vision processing, the items of interest within the set of images comprises:
   detecting a candidate item of interest within the images;
   determining that the candidate item of interest appears in more than one image of the set of images; and
   based on determining that the candidate item of interest fails to appear in more than one image of the set of images, removing the candidate item of interest from the items of interest.

4. The computer-implemented method of claim 1, wherein the operations further comprise, for each respective item of interest, storing the coordinate in data storage.

5. The computer-implemented method of claim 1, wherein the operations further comprise receiving a three-dimensional point cloud of the volume.

6. The computer-implemented method of claim 5, wherein projecting the ray from the camera center of the camera through the virtual representation of the respective item of interest in the respective image further comprises:
   projecting the ray from the camera center through the virtual representation of the respective item of interest until the ray intersects a first point in the three-dimensional point cloud; and
   determining the coordinate for the respective item of interest to be a coordinate of the first point.

7. The computer-implemented method of claim 1, wherein each respective image comprising data specifying a corresponding location from which the camera captured the respective image.

8. The computer-implemented method of claim 7, wherein the operations further comprise, for each respective image, determining, using the data specifying the corresponding locations from which the camera captured the respective image, the camera center of the camera that captured the respective image.

9. The computer-implemented method of claim 7, wherein the data specifying the corresponding location from which the camera captured the respective image comprises:
   an x coordinate;
   a y coordinate;
   a z coordinate;
   a pitch coordinate;
   a yaw coordinate; and
   a roll coordinate.

10. The computer-implemented method of claim 1, wherein the operations further comprise generating, for each respective item of interest, a corresponding bounding box.

11. A system comprising:
   data processing hardware; and
   memory hardware in communication with the data processing hardware, the memory hardware storing instructions that when executed on the data processing hardware cause the data processing hardware to perform operations comprising:
      receiving, for a volume within an environment, a set of images, each respective image captured by a camera at a corresponding location within the environment;
      detecting, using computer vision processing, a plurality of items of interest within the set of images; and
      for each respective item of interest in each respective image:
         projecting a ray from a camera center of the camera through a virtual representation of the respective item of interest in the respective image; and
         determining a coordinate for the respective item of interest corresponding to a coordinate of the volume within the environment.

12. The system of claim 11, wherein determining the coordinate for the respective item of interest further comprises:
   identifying that an identifier corresponding to the respective item of interest fails to be collocated with the respective item of interest; and
   determining a relationship between a location of the identifier corresponding to the respective item of interest and a location of the respective item of interest.

13. The system of claim 11, wherein detecting, using the computer vision processing, the items of interest within the set of images comprises:
   detecting a candidate item of interest within the images;
   determining that the candidate item of interest appears in more than one image of the set of images; and
   based on determining that the candidate item of interest fails to appear in more than one image of the set of images, removing the candidate item of interest from the items of interest.

14. The system of claim 11, wherein the operations further comprise, for each respective item of interest, storing the coordinate in data storage.

15. The system of claim 11, wherein the operations further comprise receiving a three-dimensional point cloud of the volume.

16. The system of claim 15, wherein projecting the ray from the camera center of the camera through the virtual representation of the respective item of interest in the respective image further comprises:
   projecting the ray from the camera center through the virtual representation of the respective item of interest until the ray intersects a first point in the three-dimensional point cloud; and
   determining the coordinate for the respective item of interest to be a coordinate of the first point.

17. The system of claim 11, wherein each respective image comprising data specifying a corresponding location from which the camera captured the respective image.

18. The system of claim 17, wherein the operations further comprise, for each respective image, determining, using the data specifying the corresponding locations from which the camera captured the respective image, the camera center of the camera that captured the respective image.

19. The system of claim 17, wherein the data specifying the corresponding location from which the camera captured the respective image comprises:
   an x coordinate;
   a y coordinate;
   a z coordinate;
   a pitch coordinate;
   a yaw coordinate; and
   a roll coordinate.

20. The system of claim 11, wherein the operations further comprise generating, for each respective item of interest, a corresponding bounding box.

* * * * *